(12) United States Patent
Monson

(10) Patent No.: US 6,550,921 B1
(45) Date of Patent: Apr. 22, 2003

(54) THREE HUNDRED SIXTY DEGREE VIEWABLE TACTICAL DISPLAY

(75) Inventor: Robert James Monson, St. Paul, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/523,712

(22) Filed: Mar. 13, 2000

(51) Int. Cl.[7] .............. G03B 21/00; G03B 21/24; G03B 37/00; H04N 7/00; G09B 19/16
(52) U.S. Cl. .............. 353/122; 353/12; 353/13; 353/94; 348/36; 348/38; 348/39; 434/38; 434/44; 352/69; 352/70
(58) Field of Search .............. 353/94, 30, 12, 353/13, 122; 438/38, 44; 352/69, 70; 348/36, 39, 38, 44; 434/38, 44

(56) References Cited

U.S. PATENT DOCUMENTS

| | | | |
|---|---|---|---|
| 5,264,881 A | * 11/1993 | Brooke | 353/94 |
| 5,808,663 A | 9/1998 | Okaya | 348/15 |
| 6,176,584 B1 | * 1/2001 | Best et al. | 353/30 |
| 6,219,090 B1 | * 4/2001 | Nalwa | 348/36 |
| 6,261,100 B1 | * 7/2001 | Bragdon | 434/29 |
| 6,286,962 B1 | * 9/2001 | Hennes et al. | 353/94 |
| 6,367,934 B1 | * 4/2002 | Salesky et al. | 353/74 |
| 2001/0040671 A1 | * 11/2001 | Metcalf | 353/94 |

* cited by examiner

Primary Examiner—Russell Adams
Assistant Examiner—Melissa J. Koval
(74) Attorney, Agent, or Firm—Patrick M. Hogan; Glenn W. Bowen

(57) ABSTRACT

A tactical display unit having a set of abutting viewing screens with each of the viewing screens located at an angle of at least 60 degrees to each other and each having an identical image thereon with the screens positioned either above or below a lateral head region of the viewers to create a communications zone where each of the viewers can both visually and orally communicate with one another even if viewers are on the opposite side of the viewing screens.

13 Claims, 3 Drawing Sheets

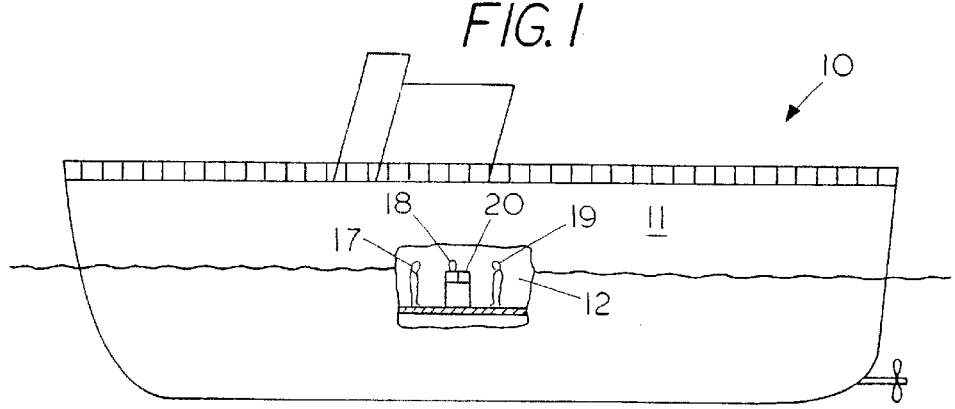
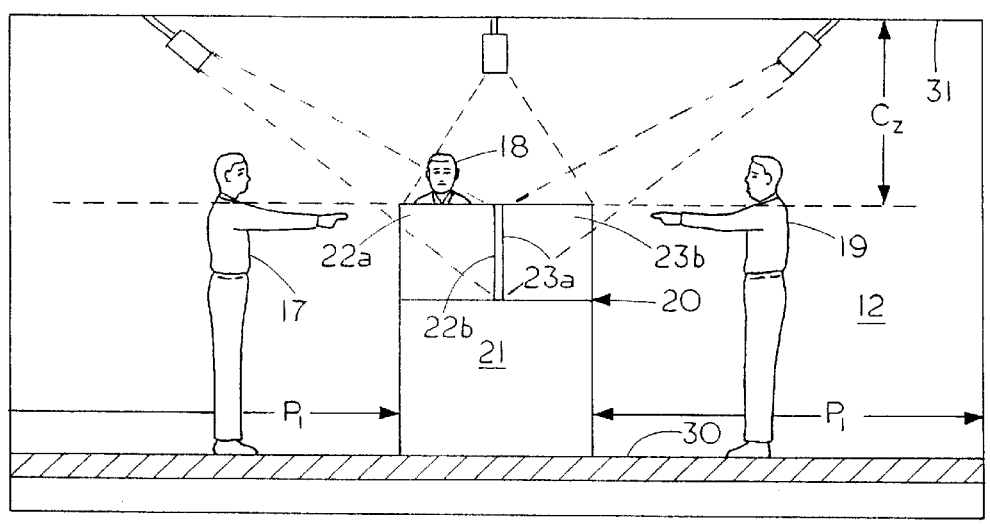

THREE HUNDRED SIXTY DEGREE VIEWABLE TACTICAL DISPLAY

FIELD OF THE INVENTION

This invention relates to communication centers and, more specifically, to a communication center having a tactical display with the tactical display including a set of abutting screens with identical images thereon that provide a 360 degree viewing area and a communications zone to allow viewers positioned in the 360 degree viewing area to visually and orally communicate with one another.

BACKGROUND OF THE INVENTION

In communications centers with tactical displays a visual image is usually projected onto a single screen or onto multiple screens positioned on walls around the periphery of the room. One of the difficulties with such systems is that if the screens are on opposite walls some viewers will have their back to others in order to view the images on the screen. This is often a hindrance to communications between viewers since observance of facial and hand gestures are important to clear communication between viewers. Another difficulty, is that the use of screens on opposite walls can limit the number of viewing positions in a given area since the viewers must all be positioned inwardly from the viewing screens. In certain applications such as in ships or submarines space is a premium In addition, oftentimes crowding viewers into a small area can cause feelings of uneasiness if a viewer feels his or her personal space is being violated.

In the present invention, a set of viewing screens are centrally positioned in an abutting relationship to create a peripheral viewing area. The peripheral viewing area enables a viewer to view either a single image from one of the screens or a first portion of an image from one of the screens and a second portion of the image from a second screen So that wherever the viewer is located in the peripheral viewing area the viewer can obtain a composite but complete visual image. By placing the screens at a height that does not interfere with each of the viewers observing one another one creates a communications zone that allows those viewers observing the visual images to both verbally and visually communicate with one another thereby lessening the chance of a miscommunication. In addition by having the viewing screens centrally located with a peripheral viewing area one generates the maximum personal space for each of the viewers thereby enhancing the comfort of the viewers.

SUMMARY OF THE INVENTION

Briefly, the present invention comprises a set of abutting viewing screens with each of the viewing screens located at an angle of at least 60 degrees to each other and each having an identical image thereon with the screens positioned ether above or below a lateral head region of the viewers to create a lateral communications zone where each of the viewers can both visually and orally communicate with one another even if viewers are on the opposite side of the viewing screens.

BRIEF DESCRIPTION OF THE DRAWINGS

FIG. 1 is a side view of a ship having a portion cut-a way to reveal a communications center having a multiple abutting viewing screens therein;

FIG. 2 is an enlarged view of the communications center in the ships showing the abutting viewing screens with viewers heads positioned above the viewing screens;

DESCRIPTION OF THE PREFERRED EMBODIMENT

Figure 3:
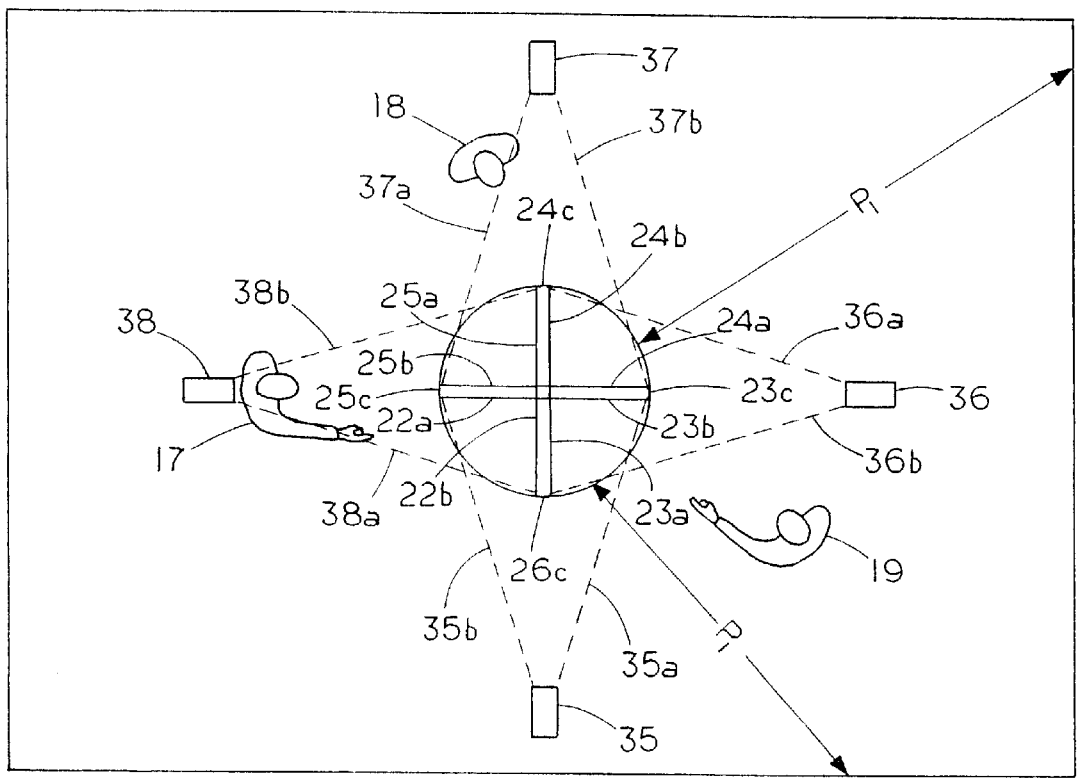
FIG. 3 is a top view of the communications center of FIG. 2 showing the viewers positioned in the peripheral viewing area.

FIG. 1 is a side view of a ship 10 having a portion of hull 11 cut-a-way to reveal a communications center 12 having a tactical display comprised of multiple, abutting viewing screens 20 therein with viewers 17, 18 and 19 positioned circumferentially therearound. Typically, communications center 12 can include the personnel who operate ship 10 as well as those personnel who are providing instructions to the crew of the ship.

FIG. 2 is an enlarged view of the communications center 12 showing the tactical display, which comprises abutting viewing screens 20. Viewing screens 20 are shown in greater detail in FIG. 3. The viewing screens are positioned on a pedestal 21 that holds the viewing screens 20 above floor 30 but below ceiling 31 to create a lateral communications zone $C_z$ thereabove. Note, the heads of viewers 27, 28 and 19 are positioned above the viewing screens 20 so that each of the viewers can visually observe the other viewer. In addition, since each of the viewers are facing radially inward the viewers can see each other without having to turn their bodies. The pedestal 21, which holds viewing screens 20, is centrally positioned in communications center 12 to provide an annular 360° peripheral viewing area, which is identified by $P_1$. It is within this annular shaped peripheral viewing area $P_1$ that persons can simultaneously view the image on the screens 20 and can both visually and orally communicate with others in the communications zone $C_z$. Note, with the viewers positioned in the peripheral viewing position the arm gesture of viewer 17 and viewer 19 are visible to each other over the screens 20 since the viewers heads project above the screens to allow each viewer to observe a portion of the upper torso of another viewer. While the viewing screens are positioned on the floor with the communication zone $C_z$ located above it is also envisioned that if sufficient ceiling height is a available the viewing screens could be suspended from the ceiling with the communications zone located below the viewing screens.

In the embodiment shown in FIGS. 2 and 3 the viewing screens are arranged in mutual perpendicular planes to form a cross. In addition the individual viewing screens are arranged in a back to back relationship thereby decreasing the size of the room necessary for a viewer to comfortably view the images. That is, with the viewing screens arranged in a cross and in a back to back relationship each of the viewers can position themselves at the minimum comfortable screen viewing distance from the viewing screens while at the same time minimizing the distance between each of the viewers since the back of one screen forms the front of another screen. If the room contains background noises the ability of the viewers to be closer to each other as they discuss matters in the communications center can enhance the effectiveness of the crew as well as minimizing communications errors between viewers.

The set of abutting screens 20 comprises a set of eight flat viewing screens that are positioned in the form of a cross with a set of projectors 35, 36, 37 and 38 directing an identical visual image onto a viewing surface formed from adjacent screens that are positioned laterally of each other. That is, projector 36 directs a first image onto a screen 23a and to an adjacent screen 24b with the boundaries of the first image identified by the dashed lines 36a and 36b so as to provide a single visual image that covers both screen 23a and adjacent screen 24b. Projector 37 directs a second image identical to the first image onto screen 24a and to adjacent screen 25b with the boundaries of the image from projector 37 identified by the dashed lines 37a and 37b so as to provide a second visual image that is identical to the first image with the second visual image covering both screen 24a and screen 25b. Similarly, projector 38 projects a third image identical to the first image onto screen 25a and to adjacent screen 22b with the boundaries of the third image from projector 38 identified by the dashed lines 38a and 38b so as to provide a visual image that is identical to the first image with the third visual image covering both screen 25a and screen 22b. Likewise, projector 35 directs a fourth image identical to the first image onto screen 22a and to adjacent screen 23b with the boundaries of the fourth image from projector 35 identified by the dashed lines 35a and screen 35b so as to provide a fourth visual image that is identical to the first image with the fourth visual image from projector 35 covering both screen 22a and adjacent screen 23b.

The viewing screens 20 which are comprised of intersecting screens allow the edge of the screens to form a visual image splitter so as to visually block a viewer from seeing a redundant portion of another image. That is edge 23c, 24c, 25c and 26c each project outward as a divider so as to block a portion of the screen to enable the viewer to view a single image from more than one peripheral position with the single image being formed by the image from one projector or a composite image from two screens.

Figure 4:
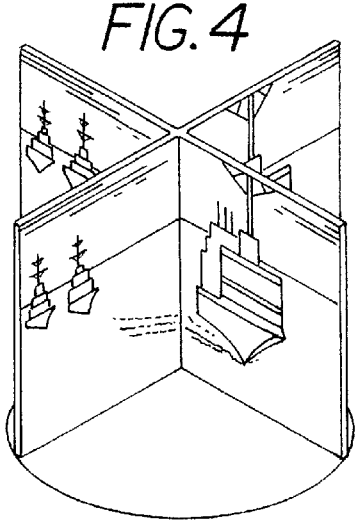
FIG. 4 is a perspective view of abutting viewing screens that intersects in a cross pattern.
Figure 5:
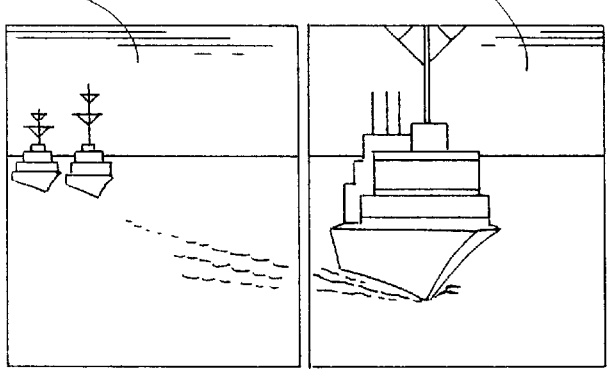
FIG. 5 is a view observed when the a viewer is positioned perpendicular to a viewing screen.
Figure 6:
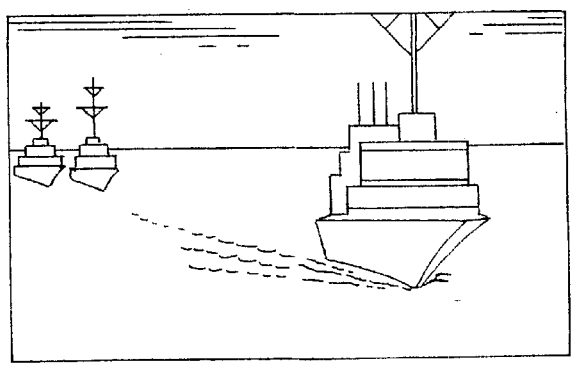
FIG. 6 is view observable when a viewer is positioned at a 45 degree angle to the viewing screen.

In order to appreciate how the projecting edges of the screens interact to produce composite visual images reference should be made to FIGS. 4, 5, and 6. FIG. 4 shows a perspective view of the screens 20 located in a cross with identical images located on the screens that are positioned in an end-to-end relationship. FIG. 5 shows a view, which would be observed by viewer 17 with the viewed image comprised of a composite image formed by the image on screen 25a and on screen 22b. FIG. 6 shows a view observed by viewer 19 who is positioned to view both screens 23a and 23b. While viewer 19 sees a shortened screen image all the information is present for the viewer. In contrast, the viewer 18 in FIG. 3 will see a composite image formed by a portion of the image on screen 24a and a further portion of the image from screen 25b. In either case each of the viewers views a complete image.

While the viewing screens are shown being positioned either above or below the lateral head viewing region of the viewers to create a communications zone there may be instances where such positioning is not needed or desirable. In those cases the viewers in the peripheral viewing area could communicate orally but not necessarily visually.

While four projectors are shown, it is envisioned that less projectors could be used. For example, the number of projectors could be reduced in half by using a beam splitter and a set of mirrors to direct one part of the split image onto one screen and the deflected image onto another screen.

Figure 7:
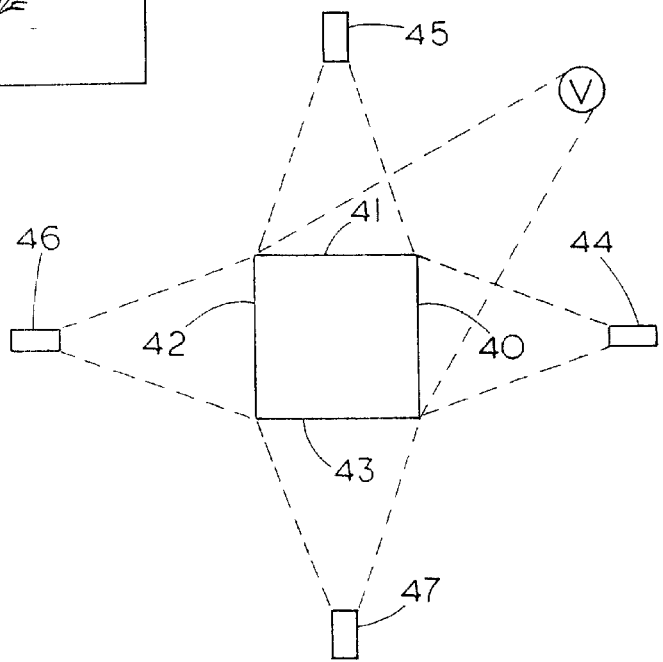
FIG. 7 shows an alternate embodiment of an abutting screen arranged in a square with four screens having the identical image thereon.

FIG. 7 shows an alternate embodiment of an abutting screen arranged in a square with four screens 40, 41, 42 and 43 having the identical image thereon. A first projector 44 directs an image onto screen 40, a second projector 45 directs the identical image onto screen 41, a third projector directs the identical image onto screen 42 and a fourth projector 47 directs the identical image onto the screen 43. With this embodiment the viewer sees either a single image or a double image since the screen does not project outward to split the viewers image.

Figure 8:
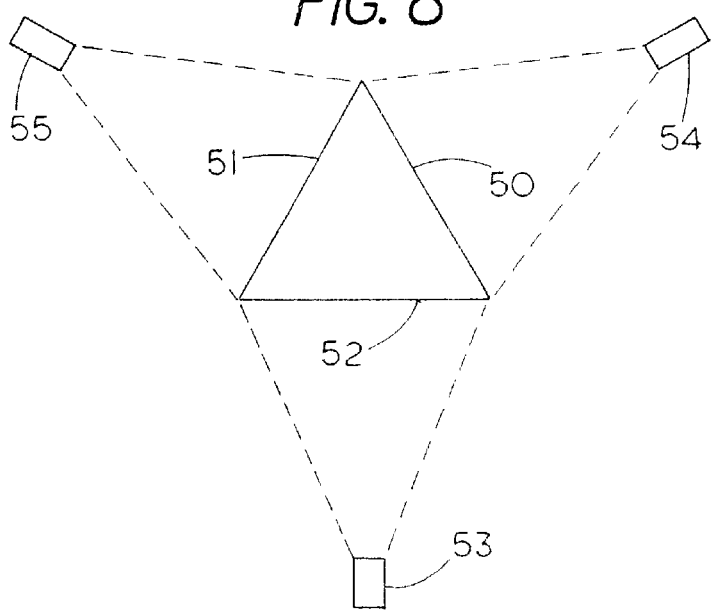
FIG. 8 shows an alternate embodiment of an abutting screen arranged in a triangle with three screens having identical images thereon.

FIG. 8 shows an alternate embodiment of an abutting screen arranged in a triangle with three screens 50, 51 and 52 having identical images thereon. Each of the sides form a 60 degree angle with an adjacent side. A first projector 53 directs an image onto screen 52, a second projector 54 directs the identical image onto screen 50, a third projector 55 directs the identical image onto screen 51. With this embodiment the viewer sees either a single image or a double image since the screen does not project outward to act as a divider.

While FIG. 7 and FIG. 8 show alternate embodiments of the invention that can be made once the teaching of the present invention is known, they generally require further viewer positioning from the viewing screens since the viewing screens are not located in a back to back relationship as shown in FIG. 3.

Thus with the present invention includes a method of providing both visual and oral communication to a group of viewers comprising the steps of:

(a) placing a set of at least three viewing screens 20 in a central portion of a room 12;

(b) projecting an identical set of images onto the at least three viewing screens 20;

(c) vertically positioning the viewing screens 20 so that the viewing screens 20 are either above or below a viewer head region to create a communication zone; and (d) positioning the viewers in a peripheral viewing area $P_1$ facing the viewing screens 20 in the central portion of the room 12 to thereby enable the viewers to view the image from any position in the peripheral viewing area and to visually and orally communicate with each other over or under the viewing screens 20.

I claim:

1. A communications center comprising:

a ship;

a room in said ship, said room having a floor and a ceiling located a first vertical distance above said floor;

a flat visual display, said visual display having a set of abutting screens each with a visual image thereon, each of said abutting screens located in a back-to-back relationship with another abutting screen to form an edge that projects outward to form a visual divider to enable a composite image to be viewed from a portion of an image from a first screen and a further portion of an image on a second screen, said visual display centrally supported in said room to thereby provide a 360 degree viewing of the visual images from one or more of the intersecting screens, said visual display having a height less than said first vertical dimension to thereby create a visually unobstructed communication zone to enable both visual and audio communication with another person through the communication zone.

2. The communications center of claim 1 wherein said set of abutting screens are arranged in a cross.

3. The communications center of claim 1 wherein said set of abutting screen are arranged in a triangle.

4. The communications center of claim 1 wherein said set of abutting screen are arranged in a square.

5. The communications center of claim 1 including a set of visual projectors for projecting a set of identical visual images onto the abutting screens.

6. The communications center of claim 1 wherein the set of abutting screens are flat.

7. A communications center comprising:

a ship;

a room in said ship, said room having a floor and a ceiling located a first vertical distance above said floor;

a flat visual display, said visual display having a set of abutting screens each with a visual image thereon, said set of abutting screens comprising of at least eight separate viewing screens with at least two viewing screens positioned laterally of each other to allow the lateral viewing screens to hold a single visual image thereon, said visual display centrally supported in said room to thereby provide a 360 degree viewing of the visual images from one or more of the intersecting screens, said visual display having a height less than said first vertical dimension to thereby create visually unobstructed communication zone to enable both visual and audio communication with another person through the communication zone.

8. A tactical display comprising:

a first screen;

a second screen; said second screen located at an angle of at least 60 degrees to said first screen;

a third screen said third screen located an angle of at least 60 degrees to said second screen;

a set of projectors, each of said set of projectors directing an identical image onto each of said screens;

a peripheral viewing area for viewing said screens, said peripheral viewing area located circumferentially around to form a plurality of peripheral viewing positions to thereby enable a viewer to view either a single image from one of the screens or a first portion of an image from one of the screens and a second portion of an image from a second screen so that the viewer can obtain a complete visual image regardless of the peripheral viewing position.

9. The tactical display unit of claim 8 including a fourth screen with said fourth screen and said first screen in a back to back relationship.

10. The tactical display unit of claim 9 wherein the second and the third screen are in a back to back relationship.

11. The tactical display unit of claim 10 wherein the fourth screen and the first screen are positioned perpendicularly to the second and the third screen.

12. The tactical display unit of claim 11 wherein the screens are flat.

13. The tactical display unit of claim 12 wherein each of the screens are positioned in a vertical plane.

* * * * *